2,999,011
METHOD FOR BLEACHING HYDROUS TITANIUM DIOXIDE

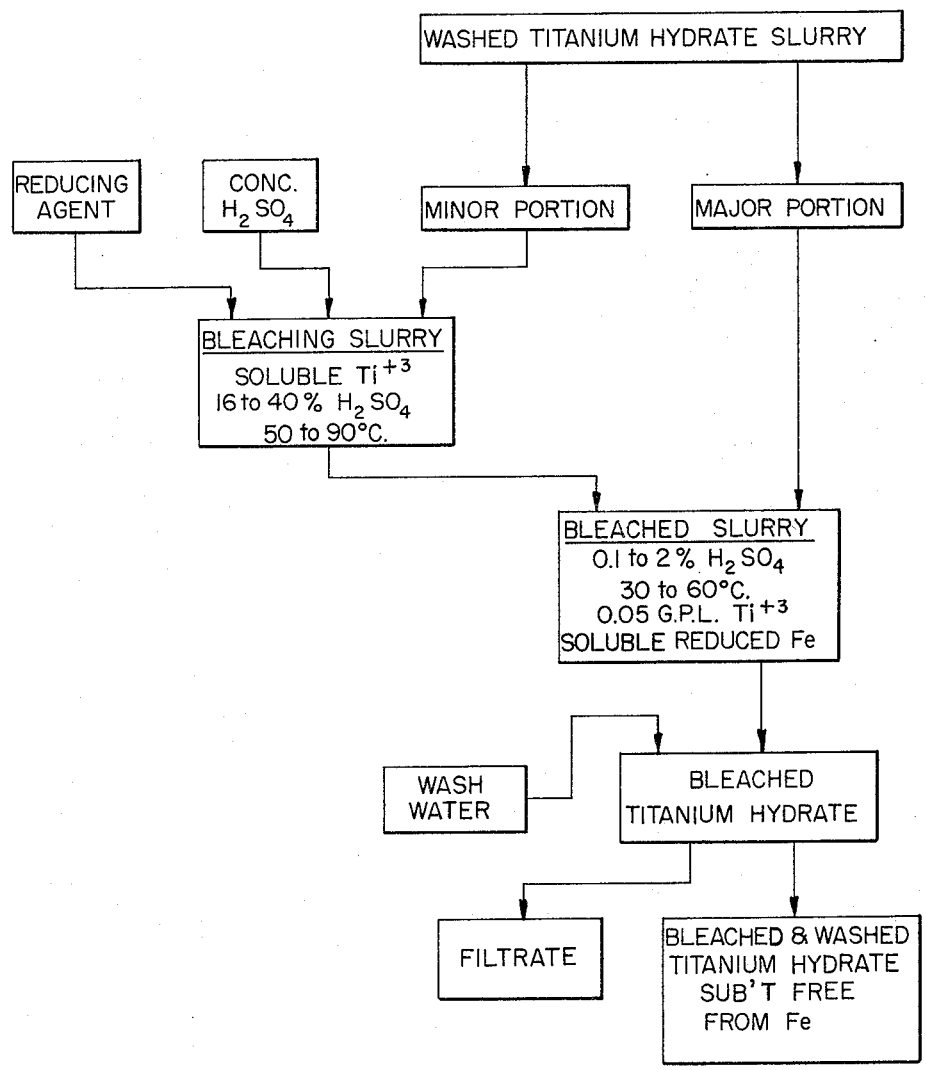

Lester E. Olmsted, Affton, and Eckard J. Puetz, Jefferson Barracks, Mo., assignors to National Lead Company, New York, N.Y., a corporation of New Jersey
Filed Dec. 31, 1959, Ser. No. 863,215
4 Claims. (Cl. 23—202)

This invention relates in general to a process for improving the color of titanium dioxide pigments. More particularly, it relates to an improved process for removing colored impurities, particularly iron, from a titanium hydrate which is formed during the production of titanium dioxide pigments.

In preparing titanium dioxide pigments, ilmenite or rutile ores are digested in concentrated sulfuric acid to form a titanium sulfate and iron sulfate solution. This solution is clarified of insoluble matter and then hydrolyzed to produce a titanium hydrate, which is thoroughly washed to remove the iron sulfate solution. The washed hydrate is then normally treated with metallic zinc or aluminum to reduce chemically the residual adsorbed colored iron compounds to lower valent states, inasmuch as these are more readily removed from the titanium hydrate by washing than iron compounds of higher valencies.

Even after washing, however, titanium hydrate will contain a small amount of iron as an impurity which, if not reduced to a minimum, produces brown tone pigments. A typical amount of iron present in washed titanium hydrates prior to bleaching is 0.05% $Fe_2O_3$ based on the weight of the calcined pigment.

The instant invention is concerned with the production of titanium dioxide pigments and also composite titanium dioxide pigments containing extenders, such as anhydrite and the like. In preparing such titanium dioxide pigments, it has been discovered that in order to obtain a satisfactory, clean, white color, the iron content of the titanium hydrate must be reduced to at least the following maximum amounts based on the weight of the final pigment:

0.006% $Fe_2O_3$ for a titanium dioxide pigment
0.015% $Fe_2O_3$ for a titanium dioxide composite pigment Although the prior art methods for removing iron impurities have been used commercially for many years, they suffer from a number of disadvantages, all of which may be overcome by using the process of the instant invention.

In the prior art methods, the metal used for reduction must be highly reactive and very finely divided. The temperature of the titanium hydrate must be at least 60° C. in order to obtain a satisfactory reduction rate; in practice, temperatures as high as 80° C. are usually employed. In addition, the concentration of sulfuric acid in the hydrate must be at least 5% in order for the metal to react rapidly. Meeting these conditions leads to an inefficient and uneconomical operation.

It has been found in such prior processes that at least 0.7 lb. of aluminum metal and at least 3.2 lbs. of zinc metal are required for bleaching one ton of pigment when the concentration of sulfuric acid is held from 2% to 10% and the temperature of the hydrate is maintained from 60° C. to 90° C. Using these amounts of metal, large amounts of it remain unreacted. Moreover, this unreacted metal is not removed from the hydrate and therefore is present during the subsequent calcination and pigment finishing steps. The presence of these metals in the treated hydrate produce pigments which are not only photosensitive but also possess inferior color.

An object of the instant invention, therefore, is to provide a process for removing colored impurities from a titanium hydrate in an efficient and economical manner. Another object is to provide a method for removing the colored impurities from a titanium hydrate utilizing moderately low temperatures and low acid concentrations. Another object is to provide a method which efficiently utilizes a reducing metal to reduce the colored impurities in a titanium hydrate to a lower valent state. These and other objects will become apparent from the following more complete description of the instant invention.

Broadly, this invention contemplates a method for removing colored impurities from a titanium hydrate slurry which comprises dividing said titanium hydrate slurry into a minor and a major portion, adding to said minor portion concentrated sulfuric acid in amount to provide a sulfuric acid concentration in said minor portion of from 16% to 40%, reducing and solubilizing most of the titanium values in said minor portion to the trivalent state at a temperature of from 30° C. to boiling to form a bleaching slurry, adding the bleaching slurry containing the reduced and soluble titanium values to the major portion to form a bleached slurry, the amount of said reduced titanium values in said bleaching slurry being sufficient to reduce the colored impurities in said major portion to lower valent compounds and to solubilize the same, and to maintain at least 0.05 gram per liter of trivalent titanium in said bleached slurry; removing the solubilized, lower valent compounds of said colored impurities from said bleached slurry by filtering and washing said bleached slurry to produce a titanium hydrate substantially free from colored impurities.

In order to more fully describe the process of the instant invention, a schematic flowsheet is presented. Referring to the drawing, washed titanium hydrate obtained from the hydrolysis of a titanium and iron sulfate solution is divided into a major and a minor portion. The minor portion is admixed with sufficient concentrated sulfuric acid to produce a bleaching slurry containing from 16% to 40% $H_2SO_4$. A reducing agent, such as aluminum or zinc metal, is added in sufficient quantity to solubilize and reduce to the trivalent state most of the titanium values in the minor portion. The temperature of the mixture preferably should be held between 50° C. and 90° C. during the reduction step. Instead of adding metallic aluminum or zinc, the minor portion containing the 16–40% sulfuric acid may be reduced electrolytically, if desired; in this case, a temperature near 30° C. is preferable during the reduction step.

The bleaching slurry is then admixed with the major portion of the titanium hydrate in order to reduce the valence of the iron in the resulting titanium hydrate slurry to a soluble lower valent state compound. In order to insure that reduction of this compound has taken place, a sufficient amount of the bleaching slurry is added so that there is at least 0.05 g.p.l. trivalent titanium in the slurry. During the bleaching operation, the temperature of the slurry is not critical and any temperature from room temperature to 80° C. may be used. Temperatures above 60° C., however, are not economical. The amount of sulfuric acid present during the bleaching of the hydrate slurry should be at least 0.1% sulfuric acid but preferably no more than 1% to 2% for economic reasons. The time of bleaching is substantially instantaneous and therefore it is not necessary to hold the slurry for any extended time period for the reduction and solubilization of the iron to take place.

The bleached slurry is then filtered and washed thoroughly with water to remove the solubilized and reduced iron compound. The bleached and washed titanium hydrate thus produced is substantially free from iron, i.e. below the maxima which may be tolerated in the finished pigment, and therefore when calcined and finished as a titanium dioxide pigment, it possesses a clean, white color.

In order to more fully illustrate the instant invention, the following examples are presented:

*Example 1*

A thoroughly washed slurry of titanium hydrate containing calcium sulfate was prepared by the hydrolysis of a titanium sulfate solution in the presence of anhydrite. This washed slurry contained 27% solids and had an iron content of 0.45% $Fe_2O_3$ by weight on a calcined pigment basis.

59 parts of this titanium hydrate slurry (representing the minor portion) were placed in a tank and agitated. 20 parts of 66° Baumé sulfuric acid were added. This amount of sulfuric acid was sufficient to form a 30% sulfuric acid solution in the tank. 0.6 part of flake aluminum metal was added slowly to the mixture to form the bleaching slurry. The temperature of the slurry rose from 40° C. to 90° C. as the sulfuric acid and the aluminum metal were added.

After the aluminum metal had reacted, the bleaching slurry had the following analysis:

57 g.p.l. soluble $Ti^{+3}$
14% solids

This bleaching slurry was then added to 22,000 parts of the titanium hydrate slurry (representing the major portion) in order to bleach the major portion of the titanium hydrate. The amount of bleaching slurry added was sufficient to reduce to a lower valent compound the ferric iron in the major portion and to maintain 0.1 g.p.l. $Ti^{+3}$ in the slurry. The sulfuric acid content of the mixture was 1.0%. Although the actual bleaching took place substantially immediately, in order to insure complete bleaching, the mixture was held at 55° C. for ½ hour.

The bleached titanium hydrate was then filtered and washed thoroughly with water in order to remove the reduced and soluble colored salts.

The washed and bleached titanium hydrate contained only 0.01% $Fe_2O_3$ on a pigment basis which is below the maxima which can be tolerated in the final $TiO_2$ anhydrite composite pigment.

In addition to obtaining a substantially color free titanium hydrate, it should be stated that the bleaching operation was carried out with only 1.0% sulfuric acid and that only 0.2 lb. of aluminum metal per ton of pigment was required.

It should be noted that the prior art processes usually require at least 2% sulfuric acid in the bleaching operation so that the aluminum metal will start to react and that a temperature of at least 60° C. must be maintained in the prior processes. In addition, the prior art required at least 0.7 lb. of aluminum metal per ton of pigment. In the prior art processes, if only 0.1% to 1.0% sulfuric acid were employed in the bleaching operation, most of the aluminum metal would remain unreacted.

*Examples 2–4*

The procedure of Example 1 was repeated except that slightly different operational conditions were employed. In Example 2, a different bleaching slurry was used. In Examples 3 and 4, a titanium hydrate containing no anhydrite was used, and in Example 4 zinc dust was employed instead of aluminum metal.

The operational data and results of these runs, along with those of Example 1, are recorded in the following table:

| | Examples | | | | |
|---|---|---|---|---|---|
| | 1 | 2 | 3 | 4 | 5 |
| Minor Portion: | | | | | |
| Titanium Hydrate Slurry (parts) | 59 | 17 | 24 | 24 | 16 |
| Solids (percent) | 27 | 29 | 28 | 28 | 28 |
| $H_2SO_4$ Initial (percent) | 1.0 | 0.1 | 0.1 | 0.1 | 0.1 |
| $H_2SO_4$ Added (parts) | 20 | 9 | 8 | 8 | 6 |
| Reducing Metal Added (parts) | 0.6 Al | 0.2 Al | 0.3 Al | 0.8 Zn | Electrolytic |
| Temperature, °C | 90 | 90 | 65 | 60 | 32 |
| Bleaching Slurry: | | | | | |
| Soluble $Ti^{+3}$ (g.p.l.) | 57 | 42 | 65 | 31 | 37 |
| $H_2SO_4$ (percent) | 30 | 40 | 30 | 30 | 30 |
| Solids (percent) | 14 | 12 | 13 | 18 | 16 |
| Bleaching Slurry Used (parts) | 80 | 26 | 32 | 33 | 22 |
| Major Portion: | | | | | |
| Titanium Hydrate (parts) | 22,000 | 2,800 | 6,400 | 3,000 | 2,400 |
| Solids (percent) | 27 | 29 | 28 | 28 | 28 |
| Composition of Calcined Solids $TiO_2$, (percent) | 36 | 30 | >99 | >99 | >99 |
| Iron as $Fe_2O_3$, (percent) | 0.45 | 0.052 | 0.080 | 0.015 | 0.052 |
| Bleached Slurry: | | | | | |
| $Ti^{+3}$ in Slurry (g.p.l.) | 0.1 | 0.1 | 0.2 | 0.2 | 0.2 |
| $H_2SO_4$ (percent in solution) | 1.1 | 0.2 | 0.2 | 0.4 | 0.3 |
| Temperature, °C | 55 | 60 | 60 | 60 | 50 |
| Utilization of Red. Metal (lbs. Metal per ton pigment) | 0.2 | 0.5 | 0.4 | 1.9 | -------- |
| Final Pigment: | | | | | |
| $Fe_2O_3$ (percent) | 0.010 | 0.013 | 0.002 | 0.002 | 0.001 |
| Iron Removed by Bleaching Operation, Percent as $Fe_2O_3$ | 0.44 | 0.039 | 0.078 | 0.013 | 0.051 |

*Example 5*

This example illustrates the use of an electrolytic reduction of the minor portion of the hydrate to form the bleaching slurry instead of employing a reducing metal for reduction.

16 parts of the titanium hydrate, described in Example 3, containing 2% solids were placed in a tank with agitation. Sb—Pb cathodes and Pb anodes were mounted in the tank. 6 lbs. of $H_2SO_4$ were added to obtain 30% $H_2SO_4$ in the slurry. Current was then passed through the slurry at a 5.7 amperes/square foot cathode current density for 23 hours at which time the slurry contained 37 g.p.l. reduced titanium salts. The temperature of the slurry during the reduction step was 32° C.

This bleaching slurry was then used to bleach the major portion of the titanium hydrate in the same manner as that described in Example 1. The operational data and the results of this run are also recorded in the table.

From the above description and by the examples presented, it has clearly been shown that titanium hydrate may be bleached efficiently by a method which employs very low sulfuric acid concentrations, low temperatures and, at the same time, permits highly efficient utilization of a reducing agent. The combination of these features cannot be obtained by the prior art bleaching processes. The bleached titanium hydrate is not contaminated with unreacted reducing metal and the $Fe_2O_3$ has been removed to the extent that the titanium hydrate, when calcined, produces a clean, white titanium dioxide pigment.

While this invention has been described and illustrated by the examples shown, it is not intended to be strictly limited thereto and other modifications and variations may be employed within the scope of the following claims.

We claim:

1. A method for treating a titanium hydrate slurry to remove iron as a colored impurity therefrom which comprises dividing said titanium hydrate slurry into a minor and a major portion, adding to said minor portion concentrated sulfuric acid in amount to provide a sulfuric acid concentration in said minor portion of from 16 to 40%, reducing and solubilizing most of the titanium valties in said minor portion to the trivalent state at a temperature of from 30° C. to boiling to form a bleaching slurry, adding the bleaching slurry containing the reduced and soluble titanium values to the major portion to form a bleached slurry, the amount of sulfuric acid in said bleaching slurry being from 0.1% to 2.0% by weight, the amount of said reduced titanium values in said bleaching slurry being sufficient to reduce the iron in said major portion to a lower valent compound and to solubilize the same, and to maintain at least 0.05 gram per liter of trivalent titanium in said bleached slurry, removing the solubilized lower valent iron compound from said bleached slurry by filtering and washing said bleached slurry to produce a titanium hydrate substantially free from iron.

2. Method according to claim 1 in which the titanium values and the iron impurity in the minor portion are reduced to lower valent states by the addition of aluminum metal to the minor portion at a temperature of from 50° C. to boiling.

3. Method according to claim 1 in which the titanium values and the iron impurity in the minor portion are reduced to lower valent states by the addition of zinc metal to the minor portion at a temperature of from 50° C. to boiling.

4. Method according to claim 1 in which the titanium values and the iron impurity in the minor portion are reduced to lower valent states by electrolytic reduction.

References Cited in the file of this patent
UNITED STATES PATENTS

| | | |
|---|---|---|
| 1,489,183 | Weizmann et al. | Apr. 1, 1924 |
| 2,049,504 | Krchma | Aug. 4, 1936 |
| 2,148,283 | Washburn | Feb. 21, 1939 |